United States Patent
Choi et al.

(10) Patent No.: US 10,873,693 B2
(45) Date of Patent: Dec. 22, 2020

(54) CALIBRATION METHOD AND APPARATUS

(71) Applicant: SAMSUNG ELECTRONICS CO., LTD., Suwon-si (KR)

(72) Inventors: Kyuhwan Choi, Yongin-si (KR); Deokyoung Kang, Suwon-si (KR); Yang Ho Cho, Seongnam-si (KR); Daekun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/557,557

(22) Filed: Aug. 30, 2019

(65) Prior Publication Data

US 2020/0177794 A1 Jun. 4, 2020

(30) Foreign Application Priority Data

Dec. 3, 2018 (KR) .................. 10-2018-0153867

(51) Int. Cl.
| | |
|---|---|
| *G06T 7/80* | (2017.01) |
| *H04N 5/232* | (2006.01) |
| *G02B 3/00* | (2006.01) |
| *H04N 17/00* | (2006.01) |

(52) U.S. Cl.
CPC ....... *H04N 5/23212* (2013.01); *G02B 3/0006* (2013.01); *G06T 7/80* (2017.01); *H04N 17/004* (2013.01)

(58) Field of Classification Search
None
See application file for complete search history.

(56) References Cited

U.S. PATENT DOCUMENTS

| | | | |
|---|---|---|---|
| 7,547,873 B2 | 6/2009 | Babayoff et al. | |
| 8,019,215 B2 * | 9/2011 | Georgiev | H04N 5/225 396/276 |
| 9,400,220 B2 | 7/2016 | Zhu et al. | |
| 9,804,424 B2 | 10/2017 | Donner et al. | |
| 10,043,289 B1 * | 8/2018 | Rao | H04N 5/2254 |
| 2004/0061042 A1 | 4/2004 | Almogy et al. | |
| 2009/0225165 A1 * | 9/2009 | Reneker | G01C 11/02 348/144 |
| 2010/0020201 A1 * | 1/2010 | Chao | H04N 9/09 348/239 |

(Continued)

FOREIGN PATENT DOCUMENTS

| | | |
|---|---|---|
| JP | 2015-045635 A | 3/2015 |
| JP | 5968102 B2 | 8/2016 |

(Continued)

OTHER PUBLICATIONS

Bianca E. N. Keeler "Wavelength Division Multiplexed Optical Interconnects Using Short Pulses" IEEE Journal of Selected Topics in Quantum Electronics, vol. 9, Issue 2, Mar.-Apr. 2003, (175 pages total).

*Primary Examiner* — Twyler L Haskins
*Assistant Examiner* — Wesley J Chiu
(74) *Attorney, Agent, or Firm* — Sughrue Mion, PLLC

(57) ABSTRACT

A calibration method and apparatus are provided. The calibration method includes sensing spots at which collimated light passing through multiple lenses is imaged on a sensor and determining a transformation matrix configured to restore an image acquired using the multiple lenses based on the spots.

15 Claims, 19 Drawing Sheets

(56) References Cited

U.S. PATENT DOCUMENTS

| | | | |
|---|---|---|---|
| 2010/0265385 A1* | 10/2010 | Knight | H04N 9/8205 |
| | | | 348/340 |
| 2013/0222606 A1* | 8/2013 | Pitts | H04N 5/2254 |
| | | | 348/187 |
| 2014/0146184 A1* | 5/2014 | Meng | H04N 17/002 |
| | | | 348/187 |
| 2014/0178078 A1* | 6/2014 | Ma | H04N 5/359 |
| | | | 398/122 |
| 2016/0084714 A1 | 3/2016 | Zhu et al. | |
| 2016/0155230 A1* | 6/2016 | Drazic | H04N 5/2256 |
| | | | 348/335 |
| 2016/0205394 A1* | 7/2016 | Meng | H04N 17/002 |
| | | | 348/187 |
| 2016/0337632 A1* | 11/2016 | Vandame | H04N 17/002 |
| 2017/0084033 A1* | 3/2017 | Blonde | G06T 7/60 |
| 2017/0221223 A1* | 8/2017 | Hu | G06T 7/80 |
| 2018/0038733 A1* | 2/2018 | David | G02B 26/0841 |
| 2018/0047185 A1 | 2/2018 | Boisson et al. | |
| 2018/0139437 A1 | 5/2018 | Hwang et al. | |
| 2018/0252928 A1* | 9/2018 | Blonde | G02B 27/0075 |
| 2018/0262776 A1* | 9/2018 | Seifi | H04N 19/60 |
| 2019/0110028 A1* | 4/2019 | Borel | H04N 13/232 |
| 2019/0114796 A1* | 4/2019 | Jin | G06T 7/557 |
| 2019/0174115 A1* | 6/2019 | Drazic | G06T 7/60 |
| 2019/0236796 A1* | 8/2019 | Blasco Claret | G06T 5/002 |
| 2019/0295232 A1* | 9/2019 | Blonde | G06T 5/50 |

FOREIGN PATENT DOCUMENTS

| | | |
|---|---|---|
| KR | 10-2007-0115193 A | 12/2007 |
| KR | 10-0790689 B1 | 1/2008 |
| KR | 10-1704859 B1 | 2/2017 |

\* cited by examiner

Distance between spots

Spot size

CALIBRATION METHOD AND APPARATUS

CROSS-REFERENCE TO RELATED APPLICATION

This application claims priority from Korean Patent Application No. 10-2018-0153867, filed on Dec. 3, 2018 in the Korean Intellectual Property Office, the disclosure of which is incorporated herein by reference in its entirety.

BACKGROUND

1. Field

Methods and apparatuses consistent with exemplary embodiments relate to a calibration method and apparatus.

2. Description of the Related Art

Recently, the use of cameras in small devices such as a smartphone is rapidly increasing. In general, the smartphone may include a camera with a single lens. In terms of the single lens, miniaturization may be restricted due to a physical distance corresponding to a focal length. To reduce the focal distance, a multi-lens camera including multiple lenses is proposed.

SUMMARY

According to an aspect of an exemplary embodiment, there is provided a calibration method including sensing spots at which collimated light passing through multiple lenses is imaged on a sensor, and determining a transformation matrix configured to restore an image acquired by the multiple lenses based on the spots.

The calibration method may further include determining whether a control is to be performed to change an angle at which the collimated light is incident on the multiple lenses or an angle at which the collimated light passing through the multiple lenses is incident on the sensor, and controlling, in response to a determination that the control is to be performed, the angle at which the collimated light is incident on the multiple lenses or the angle at which the collimated light passing through the multiple lenses is incident on the sensor, wherein the sensing of the spots includes sensing spots corresponding to collimated light incident on the multiple lenses or corresponding to the sensor at the controlled angle.

The calibration method, wherein sizes of the spots may be smaller than a pixel included in the sensor.

The sensing of the spots may include sensing spots at which collimated light incident at an angle changed by a minimum angle variation within a field of view (FOV) range of the multiple lenses is imaged on the sensor.

The determining of the transformation matrix may include determining the transformation matrix based on pixel information of the sensor sensing the spots.

The sensing of the spots may include sensing spots at which collimated light incident at angles selected within an FOV range of the multiple lenses is imaged on the sensor, and the determining of the transformation matrix includes determining the transformation matrix by applying linear fitting to a result of the sensing.

The calibration method may further include determining information on the multiple lenses based on the spots, wherein the determining of the transformation matrix may include determining the transformation matrix based on the information on the multiple lenses.

The information on the multiple lenses may include at least one of rotation information, pitch information, and aberration information of the multiple lenses, gap information of the sensor and the multiple lenses, and blur information of an image acquired using the multiple lenses.

The determining of the information on the multiple lenses may include determining the rotation information of the multiple lenses based on a gradient of a connection line connecting the spots.

The determining of the information on the multiple lenses may include determining the pitch information of the multiple lenses based on a distance between the spots.

The determining of the information on the multiple lenses may include determining the gap information of the sensor and the multiple lenses based on a change in size of the spots.

The determining of the information on the multiple lenses may include determining the aberration information of the multiple lenses based on sizes of the spots.

The determining of the information on the multiple lenses may include determining the blur information of the image acquired using the multiple lenses through a sensor pixel analysis on the spots.

The transformation matrix may be configured to restore an image by modeling a light particle recorded in the sensor.

The multiple lenses may include a micro-lens array including a plurality of lenses.

A non-transitory computer-readable storage medium storing instructions that, when executed by a processor, may cause the processor to perform the calibration method.

According to another aspect of an exemplary embodiment, there is provided a calibration apparatus including a processor, and a memory including at least one instruction to be executed by the processor, wherein when the at least one instruction is executed in the processor, the processor is configured to sense spots at which collimated light passing through multiple lenses is imaged on a sensor, and determine a transformation matrix configured to restore an image acquired using the multiple lenses based on the spots.

The processor may be further configured to determine whether a control is to be performed to change an angle at which the collimated light is incident on the multiple lenses or an angle at which the collimated light passing through the multiple lenses is incident on the sensor, and control, in response to a determination that the control is to be performed, the angle at which the collimated light is incident on the multiple lenses or the angle at which the collimated light passing through the multiple lenses is incident on the sensor.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
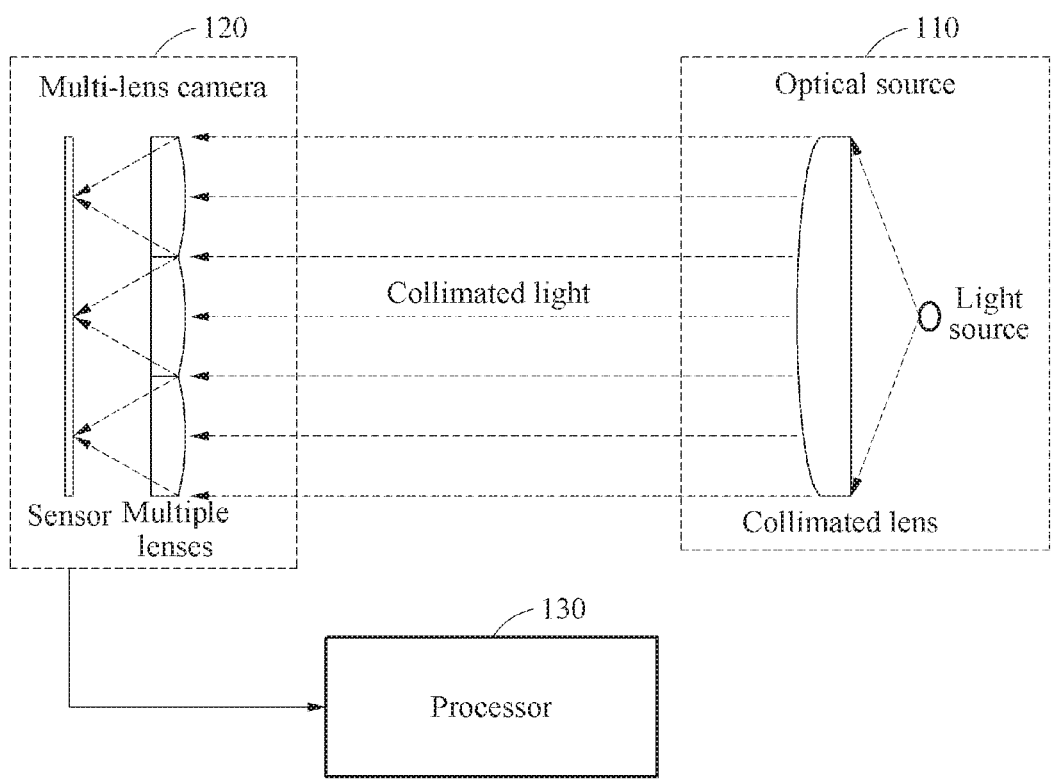
FIG. 1 is a diagram illustrating a calibration apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art.

FIG. 1 is a diagram illustrating a calibration apparatus according to an exemplary embodiment.

FIG. 1 illustrates an optical source 110, a multi-lens camera 120, and a processor 130.

The optical source 110 may generate collimated light for calibration and provide the collimated light to the multi-lens camera 120. The collimated light may be parallel light and reach the multi-lens camera 120 at a predetermined angle. For example, the optical source 110 may include a light source and a collimated lens. The light source may generate light, and the collimated lens may refract the generated light such that the generated light reaches the multi-lens camera 120 at a predetermined angle. The collimated light may be understood as light emitted in parallel to a predetermined direction.

The multi-lens camera 120 may be a camera that minimizes a focal length of a lens by imitating a binocular structure of an insect for the purpose of ultra-thinness. The multi-lens camera 120 may include multiple lenses and a sensor.

The multiple lenses may include a micro-lens array (MLA) including a plurality of lenses. In terms of a single lens, a physical distance corresponding to a focal length between the single lens and a sensor may need to be sufficiently secured. On the other hand, a focal length of a multi-lens array including N lenses may be reduced to 1/N times under a condition of the same field of view (FOV). Different image information may pass based on positions of the lenses included in the multi-lens array.

A sensor may sense light received after passing through multiple lenses. For example, the sensor may sense a spot at which collimated light passing through the multiple lenses is imaged on the sensor through at least one pixel. The sensor may output a position and a value of a pixel in which the spot is sensed.

The processor 130 may receive a sensing result of the sensor of a multi-lens camera 120 and determine a transformation matrix for restoring an image acquired using the multiple lenses. The processor 130 may store an output value, for example, pixel information of the sensor sensing the spot at which the collimated light passing through the multiple lenses is imaged on the sensor. Also, the spot may be sensed again at an angle at which the collimated light is incident on the sensor or the multiple lenses may be changed within an FOV range of the multiple lenses. In this example, the processor 130 may store an output value of the sensor sensing the spot. The processor 130 may determine based on stored values. The processor 130 may perform calibration on the multi-lens camera by analyzing spots at which the collimated light passing through the multiple lenses is imaged on the sensor and determining the transformation matrix.

Figure 2:
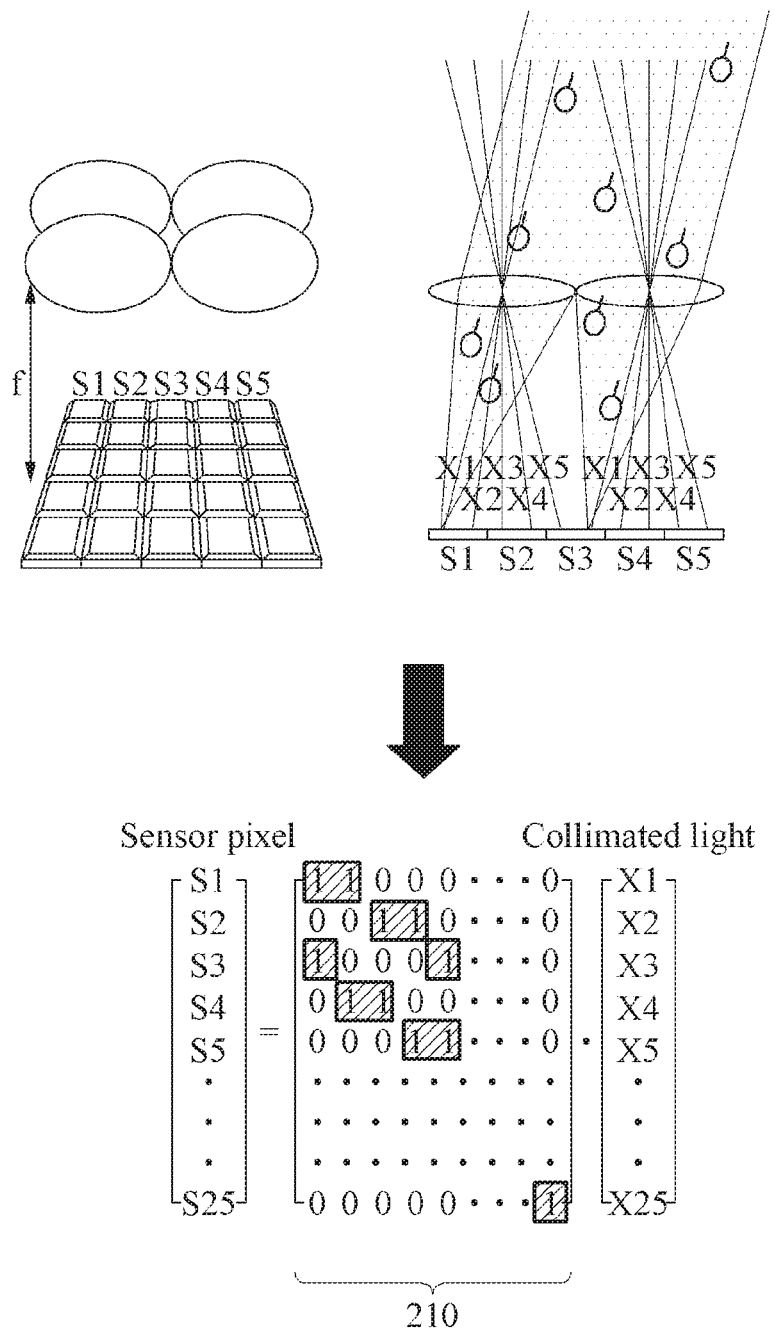
FIG. 2 is a diagram illustrating a transformation matrix according to an exemplary embodiment.

FIG. 2 is a diagram illustrating a transformation matrix according to an exemplary embodiment.

FIG. 2 illustrates an example of determining a transformation matrix based on spot position information of collimated light passing through multiple lenses based on a light field direction.

FIG. 2 illustrates multiple lenses separated in a focal length f, sensor pixels S1 through S5, and collimated light X1 through X5 in an upper portion.

The collimated light X1 through X5 may be light incident on the multiple lenses at different angles. For example, the collimated light X1 may pass through the multiple lenses and be imaged on the sensor pixels S1 and S3. Also, the collimated light X2 may pass through the multiple lenses and be imaged on the sensor pixels S1 and S4. The collimated light may coexist and may be mixed to reach the sensor pixel. Depending on the collimated light, the sensor pixel on which the collimated light is imaged may be different. Such relationship may be represented by a determinant as shown in a lower portion of FIG. 2. By using a transformation matrix 210 representing a relationship between the collimated light and the sensor pixels, a high-resolution original image may be restored from a low-resolution micro-lens array image acquired using a multi-lens camera. The transformation matrix 210 may be a light field sensing modeling.

A process of determining positions of spots at which collimated light passing through multiple lenses is imaged on a sensor may be used in determining the transformation matrix 210.

Figure 3:
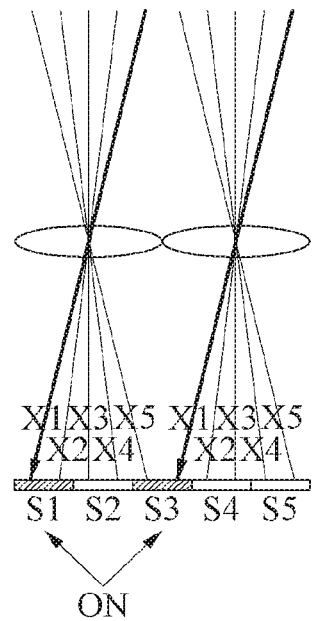
FIGS. 3 through 5 are diagrams illustrating a process of determining a transformation matrix according to an exemplary embodiment.
Figure 4:
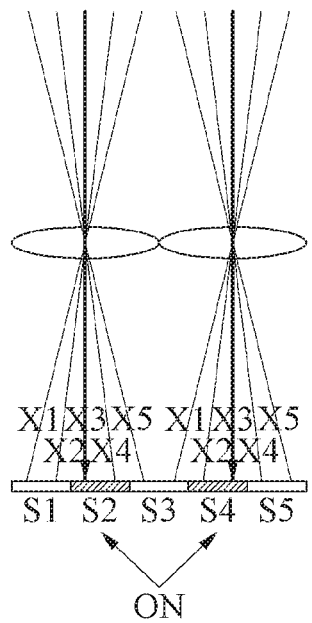
Figure 5:
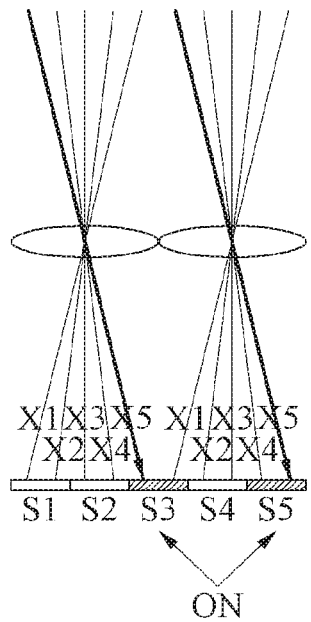

FIGS. 3 through 5 are diagrams illustrating a process of determining a transformation matrix according to an exemplary embodiment.

A calibration apparatus may finely adjust an incident angle of collimated light within an FOV range of multiple lenses and repetitively sense spots imaged on a sensor, thereby determining a transformation matrix. For example, after finely adjusting the incident angle of the collimated light, the calibration apparatus may perform an operation of sensing positions of spots at a corresponding incident angle in an overall FOV range of the multiple lenses, so that the transformation matrix is determined based on a sensing result. Also, the calibration apparatus may repetitively perform the aforementioned process on all pixels included in the sensor.

According to exemplary embodiments, calibration method may be performed irrespective of rotation, pitch, aberration of the multiple lenses, a gap between the sensor and the multiple lenses, and blur captured by the multiple lenses. Also, the calibration method may be a fundamental calibration technique for determining a transformation matrix based on information on spots corresponding to all collimated light passing through the multiple lenses.

The calibration apparatus may determine a minimum angle variation of an incident angle of collimated light that is to be finely adjusted within an FOV range of the multiple lenses as shown in Equation 1 below.

If a focal length of a single lens camera is F, a pitch of a sensor pixel is P, and a difference in incident angle of collimated light toward a center of adjacent sensor pixels is θ, the following equation may be established.

$$\tan\frac{\theta}{2} = \frac{1}{F} \times \frac{P}{2}$$

$$\theta = 2\tan^{-1}\left[\frac{1}{F} \times \frac{P}{2}\right]$$

[Equation 1]

A focal distance between the single lens camera and a multi-lens camera is F=f×L. Here, f denotes a focal distance of the multi-lens camera and L denotes a number of lenses included in the multiple lenses.

A minimum angle variation with respect to the incident angle of the collimated light in the multi-lens camera may be as follows.

$$\theta = 2\tan^{-1}\left[\frac{1}{f \times L} \times \frac{P}{2}\right]$$

[Equation 2]

For example, when a resolution of the sensor is 1200× 1200, a pitch between pixels in the sensor is 4 μm, and a focal length of the multiple lenses is 0.3 mm, the minimum angle variation may be determined to be about 0.03 degrees (°).

FIG. 3 illustrates an example in which spots at which the collimated light X1 is imaged on the sensor are sensed by the sensor pixels S1 and S3 and applied to the transformation matrix, FIG. 4 illustrates an example in which spots at which the collimated light X3 is imaged on the sensor are sensed by the sensor pixels S2 and S4 and applied to the transformation matrix, and FIG. 5 illustrates an example in which spots at which the collimated light X5 is imaged on the sensor are sensed by the sensor pixels S3 and S5 and applied to the transformation matrix FIGS. 6 through 13 are diagrams illustrating a process of determining a transformation matrix according to an exemplary embodiment.

A calibration apparatus may roughly adjust an incident angle of collimated light within an FOV range of multiple lenses. In this example, the calibration apparatus may determine a transformation matrix by applying linear fitting or a geometric triangulation method to a result obtained by repeating an operation of sensing positions of spots imaged on a sensor. For example, the calibration apparatus may sense spots corresponding to some angles of the collimated light within the FOV range of the multiple lenses and perform the linear fitting on a result of the sensing, thereby determining a transformation matrix. Also, the calibration apparatus may sense spots for some pixels selected from pixels included in the sensor and perform the linear fitting on a result of the sensing, thereby determining a transformation matrix. Through this, a required operation amount may be more effectively reduced when compared to the examples of FIGS. 3 through 5.

To this end, information on the multiple lenses determined from the sensed spots may be used. The calibration apparatus may determine information on the multiple lenses based on the spots and determine a transformation matrix based on the information on the multiple lenses. For example, the information on the multiple lenses may include at least one of rotation information, pitch information, and aberration information of the multiple lenses, gap information of the sensor and the multiple lenses, and blur information of an image acquired using the multiple lenses. Hereinafter, a process of determining the information on the multiple lenses will be described with the accompanying drawings.

Figure 6:
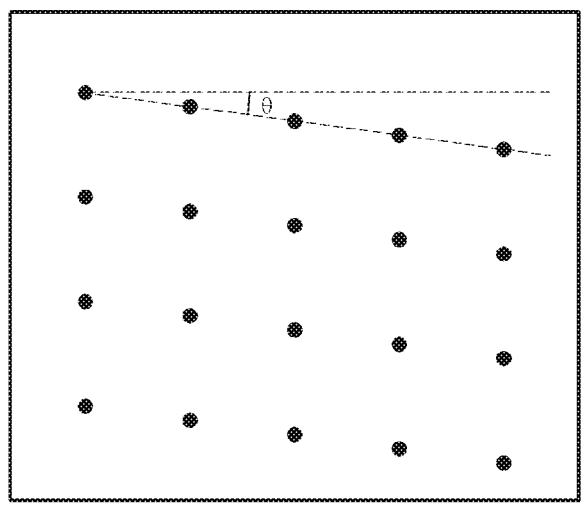
FIGS. 6 through 13 are diagrams illustrating a process of determining a transformation matrix according to an exemplary embodiment.

FIG. 6 illustrates an example of a process of determining a rotation of multiple lenses based on spots. For example, the calibration apparatus may sense spots at which collimated light incident at a predetermined incident angle is imaged on a sensor, thereby determining positions of the spots. Also, the calibration apparatus may determine a gradient θ of a connection line connecting centers of the spots, thereby determining the rotation of the multiple lenses.

Figure 7:
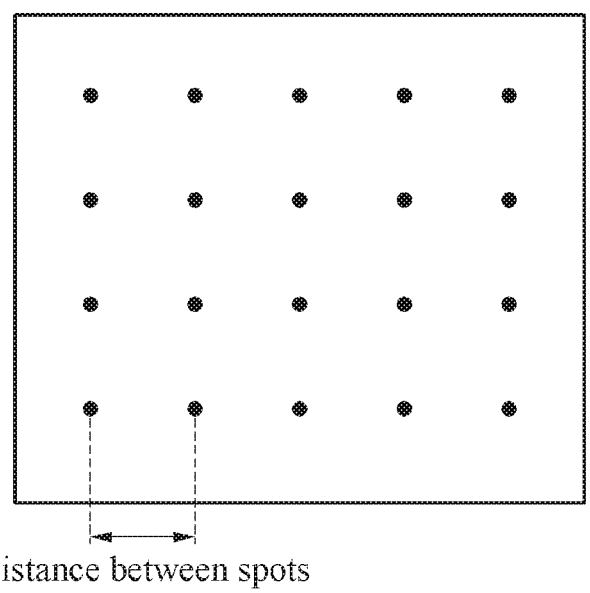

FIG. 7 illustrates an example of a process of determining a pitch of multiple lenses based on distance between spots. For example, the calibration apparatus may sense spots at which collimated light incident at a predetermined incident angle is imaged on a sensor, thereby determining positions of the spots. Also, the calibration apparatus may determine a distance between centers of the spots, thereby determining the pitch of the multiple lenses.

Figure 8:
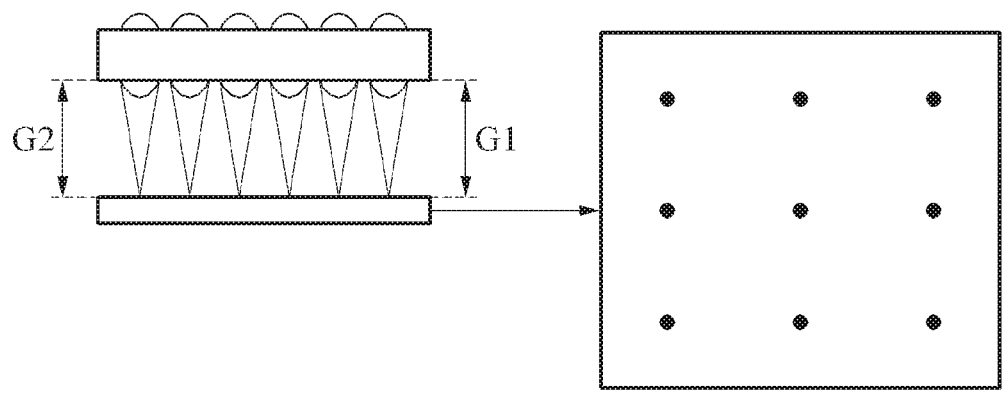
Figure 9:
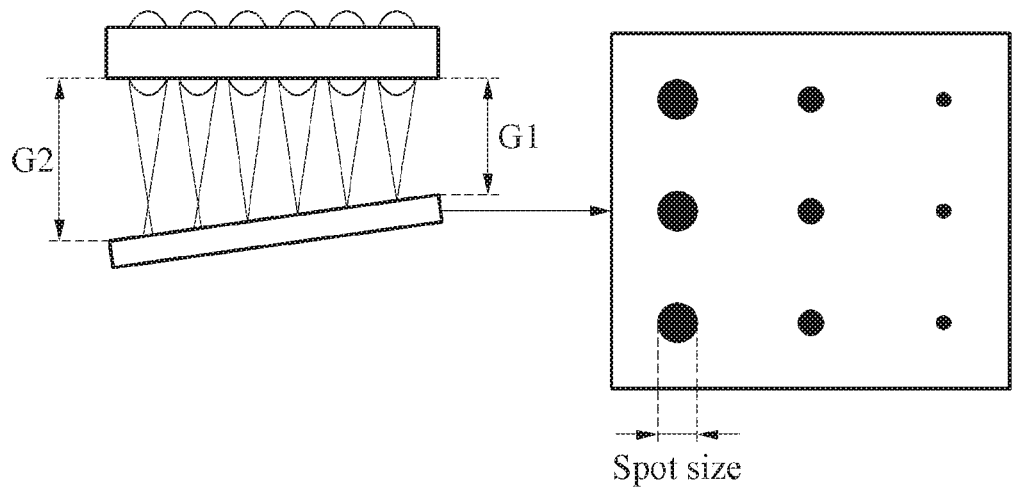
Figure 10:
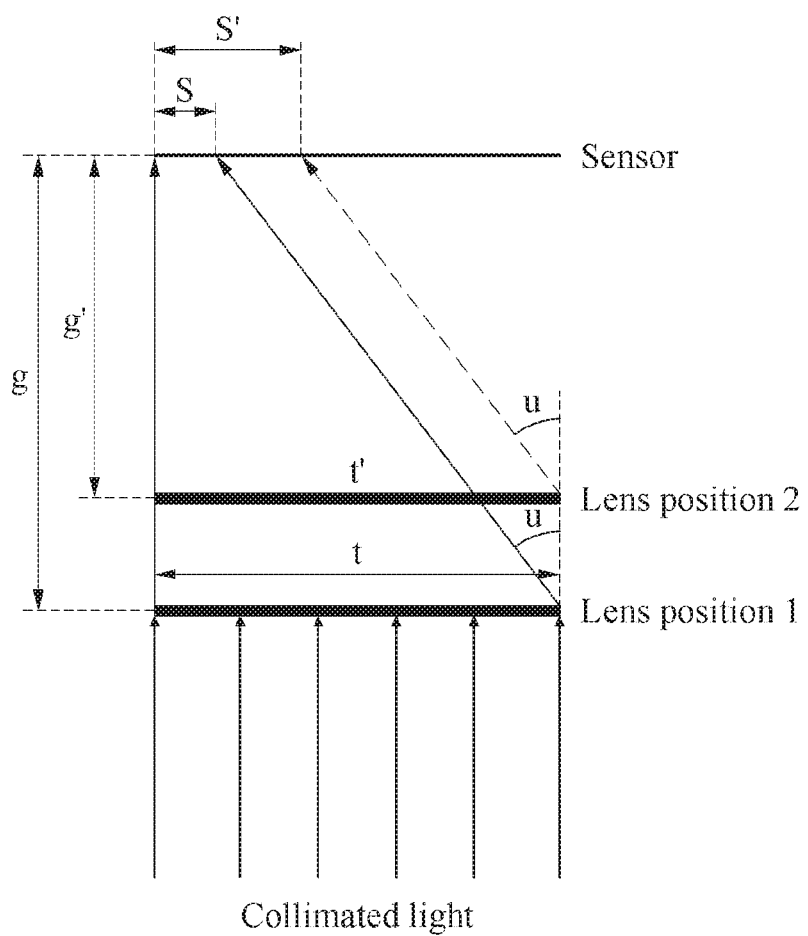

FIGS. 8 through 10 illustrate examples of a process of determining a gap between a sensor and multiple lenses based on sizes of spots. For example, the calibration apparatus may sense spots at which collimated light incident at a predetermined incident angle is imaged on a sensor, thereby determining sizes of the spots. Also, the calibration apparatus may determine the gap between the sensor and the multiple lenses based on changes in sizes of the spots.

FIG. 8 illustrates an example in which a gap between a sensor and multiple lenses is even. In this example, sizes of spots may be uniform. FIG. 9 illustrates an example in which a gap between a sensor and multiple lenses is uneven. In this example, sizes of spots may not be uniform and the more left the spot, the larger the size. As such, the calibration apparatus may determine the gap between the sensor and the multiple lenses based on changes in sizes of the spots.

Although FIG. 9 illustrates an example in which the sensor is inclined, embodiments are not limited thereto. The present disclosure may also be applicable to an example in which multiple lenses are inclined without limitation.

FIG. 10 illustrates an example of a process of determining a gap between a sensor and multiple lenses.

A gap between a sensor and multiple lenses may be determined based on sizes of spots at which collimated light passing through the multiple lenses is imaged on the sensor. The gap between the sensor and the multiple lenses may be determined based on the sizes of the spots and a paraxial ray tracing equation (PRTE) scheme may be applied thereto.

A case in which the multiple lenses are located at a lens position 1 may be considered. In FIG. 10, a leftmost light ray of the collimated light may pass through a lens center and a rightmost light ray of the collimated light may pass through a lens boundary. For example, in FIG. 10, t denotes a distance between the lens center and the lens boundary. In this example, a spot size s and a gap g between the sensor and the multiple lenses may be expressed as shown in Equation 3 below.

$$s = t + ug \quad \text{[Equation 3]}$$

In Equation 3, u denotes a lens power that refracts a light ray passing through the lens boundary.

When the gap g is changed to a gap g', for example, the multiple lenses are relocated to a lens position 2, a size of a spot imaged on the sensor may also be changed. Since the multiple lenses located at the lens positions 1 and 2 are the same multiple lenses, the lens power may also be the same. When the gap is g', a relationship between the gap g' and a spot size s' may be expressed as shown in Equation 4 below.

$$s' = t' + ug' \quad \text{[Equation 4]}$$

When Equation 4 is arranged for the gap g' and it is considered that t=t', the following equation may be obtained.

$$g' = \frac{s' - t'}{u} = \frac{s' - t}{u} \quad \text{[Equation 5]}$$

In Equation 5, u denotes a lens power and is calculated based on a focal length, t is ½ of a lens diameter, and s' denotes a measurable spot size. As such, the gap between the sensor and the multiple lenses may be determined based on the spot size.

Figure 11:
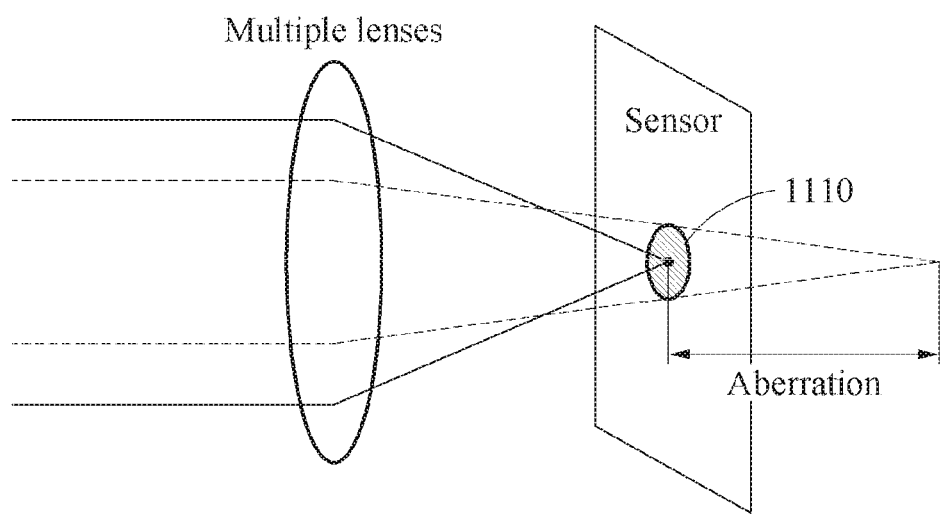

FIG. 11 illustrates an example of a process of determining an aberration of multiple lenses based on sizes of spots. A calibration apparatus may sense spots at which collimated light incident at a predetermined incident angle is imaged on a sensor, thereby determining sizes of the spots. Also, the calibration apparatus may determine an aberration of the multiple lenses based on the sizes of the spots. In this example, a gap between the sensor and the multiple lenses may be determined in advance.

For example, a first light ray passing a periphery portion of a lens may be more refracted than a second light ray passing a central portion of the lens. In this example, an aberration that light rays do not meet at one point may exist. For this reason, a size of a spot at which the second light ray is imaged on the sensor may be greater than a size of a spot at which the first light ray is image on the sensor. As such, the calibration apparatus may determine an aberration of the multiple lenses based on a size of a spot imaged on a sensor.

Figure 12:
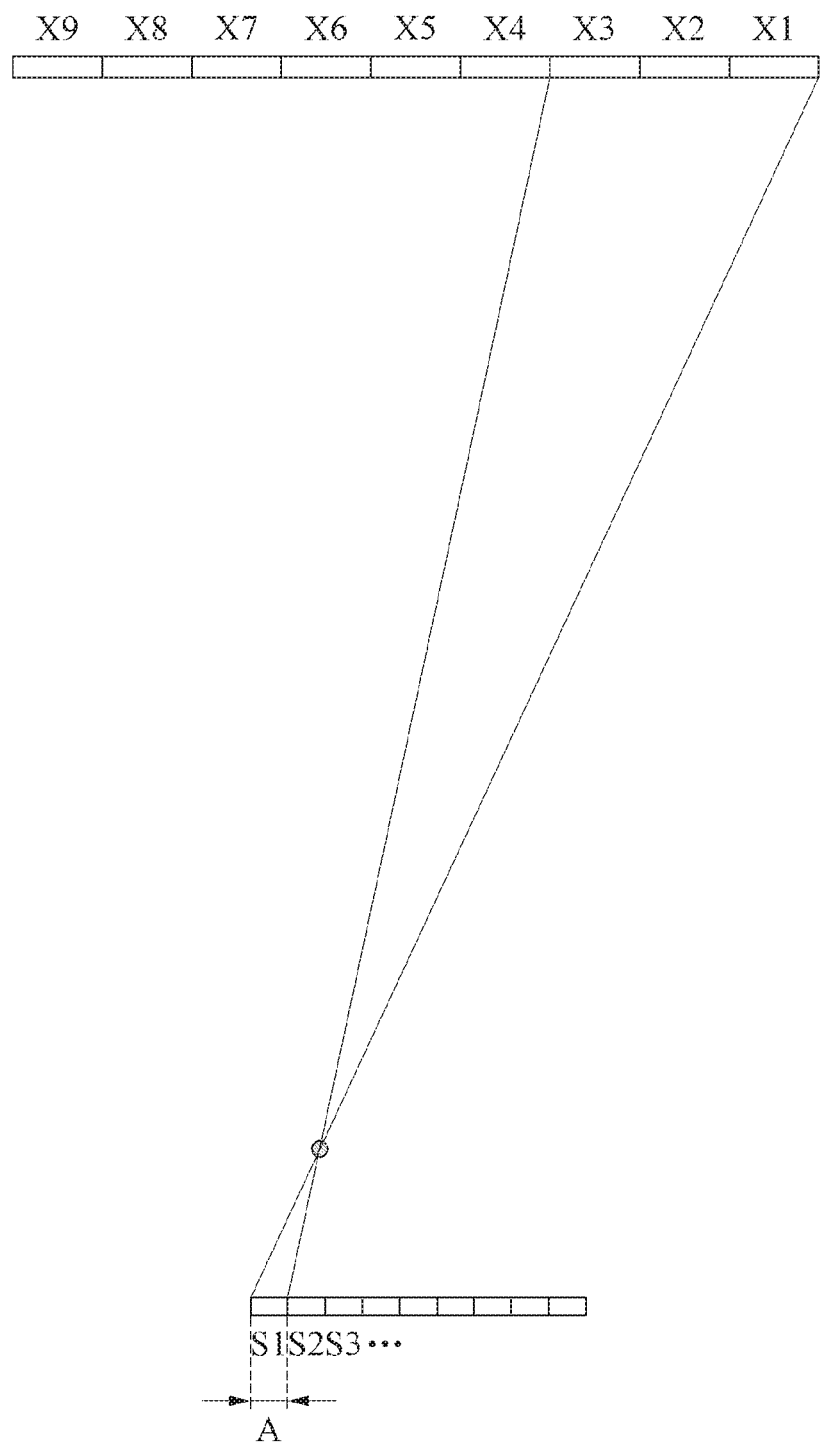
Figure 13:
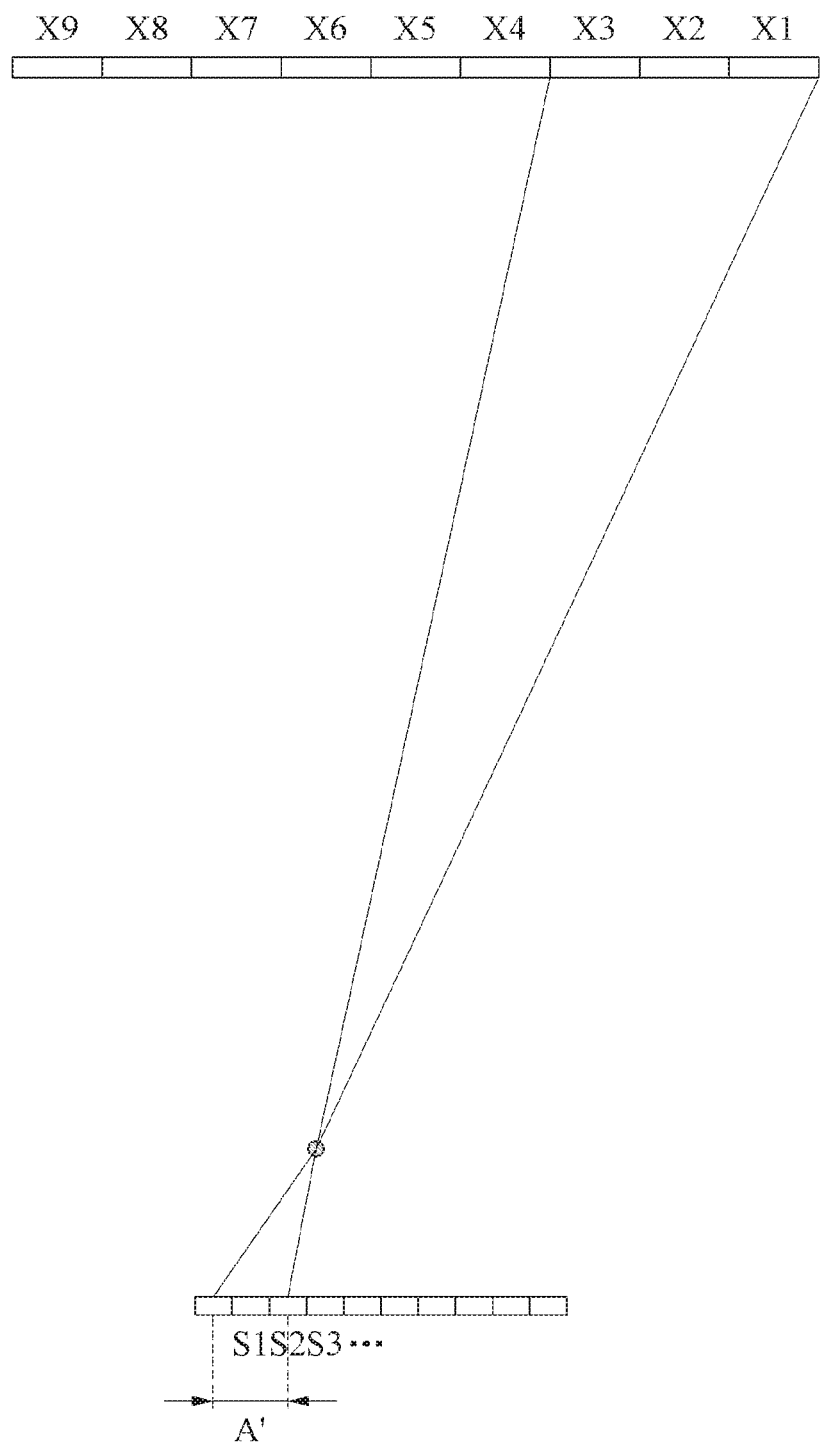

FIGS. 12 and 13 illustrate examples of a process of determining blur of an image acquired using multiple lenses through a sensor pixel analysis on spots. A calibration apparatus may determine a transformation matrix by performing a sensor pixel analysis on spots at which collimated light incident at a predetermined incident angle is imaged on a sensor. In advance to determine the blur, a gap between multiple lenses and the sensor may be determined.

FIG. 12 illustrates an example in which blur is absent. In this example, a size A of a spot at which collimated light is imaged on a sensor may be less than or equal to a size of a sensor pixel, so that the spot may be located in a sensor pixel S1. FIG. 13 illustrates an example in which blur is present. In this example, a size A' of a spot at which collimated light is imaged on a sensor may be greater than a size of a sensor pixel, so that the spot may not be located in a sensor pixel S1. Using this information, the calibration apparatus may determine a transformation matrix through an image pixel analysis on spots.

Figure 14:
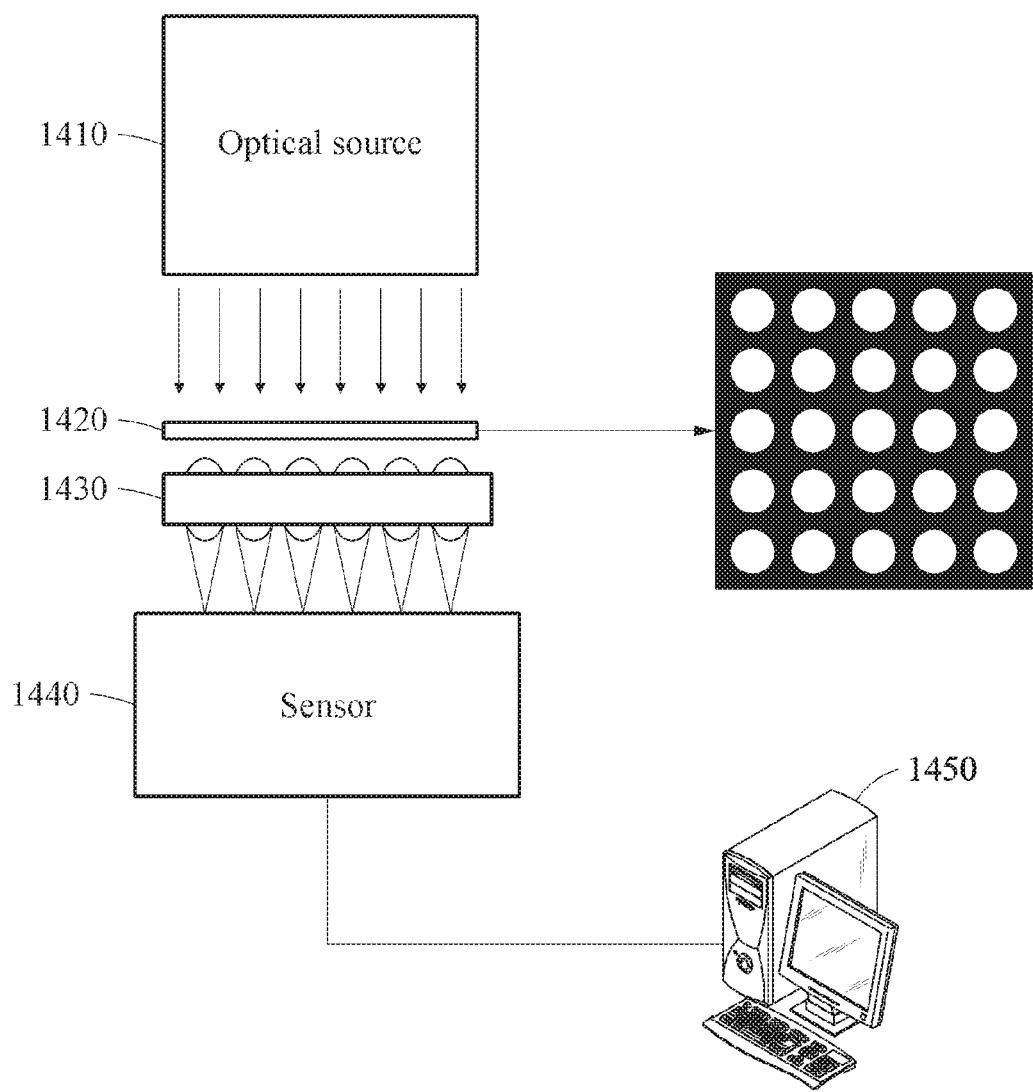
FIG. 14 is a diagram illustrating an example of a calibration apparatus according to an exemplary embodiment.

FIG. 14 is a diagram illustrating an example of a calibration apparatus according to an exemplary embodiment.

FIG. 14 illustrates an optical source 1410, a spatial mask 1420, multiple lenses 1430, a sensor 1440, and a computing device 1450.

The optical source 1410 may be a device to output collimated light and include, for example, a light source and a collimated lens. The light source may include, for example, a laser source and a light emitting diode (LED) source. Also, the optical source 1410 may include a pin hole, a spatial filter, and a lens.

The spatial mask 1420 may be a mask for blocking a noise light source, and disposed between the optical source 1410 and the multiple lenses 1430 or on a surface of the multiple lenses 1430. Also, to block light, the spatial mask 1420 may be provided in a form of film, coated on a lens surface, or configured to function as an aperture.

The multiple lenses 1430 may include a plurality of lenses. Based on positions of the lenses, light rays passing through the lenses may be different. For example, the multiple lenses 1430 may be a micro-lens array having a lens on one side or a micro-lens array having lenses on both sides.

The sensor 1440 may sense light received through the multiple lenses 1430. For example, the sensor 1440 may include a detector for recording an image.

The computing device 1450 may restore an image by receiving a sensing result of the sensor 1440. To this end, the computing device 1450 may determine a transformation matrix. For example, the computing device 1450 may store an output value of a sensor sensing spots at which collimated light passing through the multiple lenses 1430 is imaged on the sensor 1440. Also, the computing device 1450 may change an angle at which the collimated light is incident on the multiple lenses 1430 or an angle at which the collimated light passing through the multiple lenses 1430 is incident on the sensor 1440, and store output values of sensors sensing the spots. Also, the computing device 1450 may determine the transformation matrix based on the stored output value.

To control the angle at which the collimated light is incident on the multiple lenses 1430 or the sensor 1440, a control device for controlling a position and/or an angle may be provided. The control device may control the collimated light to move in a direction of at least one of x, y, and z axes in units of sensor pixel. Also, the control device may control the collimated light based on at least one of θ corresponding to an angle of x and z axes, Φ corresponding to an angle of y and z axes, and ψ corresponding to an angle of x and y axes. For example, the control device may be attached to the optical source 1410 to control a position and/or an angle of the optical source 1410. Also, the control device may be attached to the multiple lenses 1430 or the sensor 1440 to control a position and/or an angle of the multiple lenses 1430 or the sensor 1440.

Figure 15:
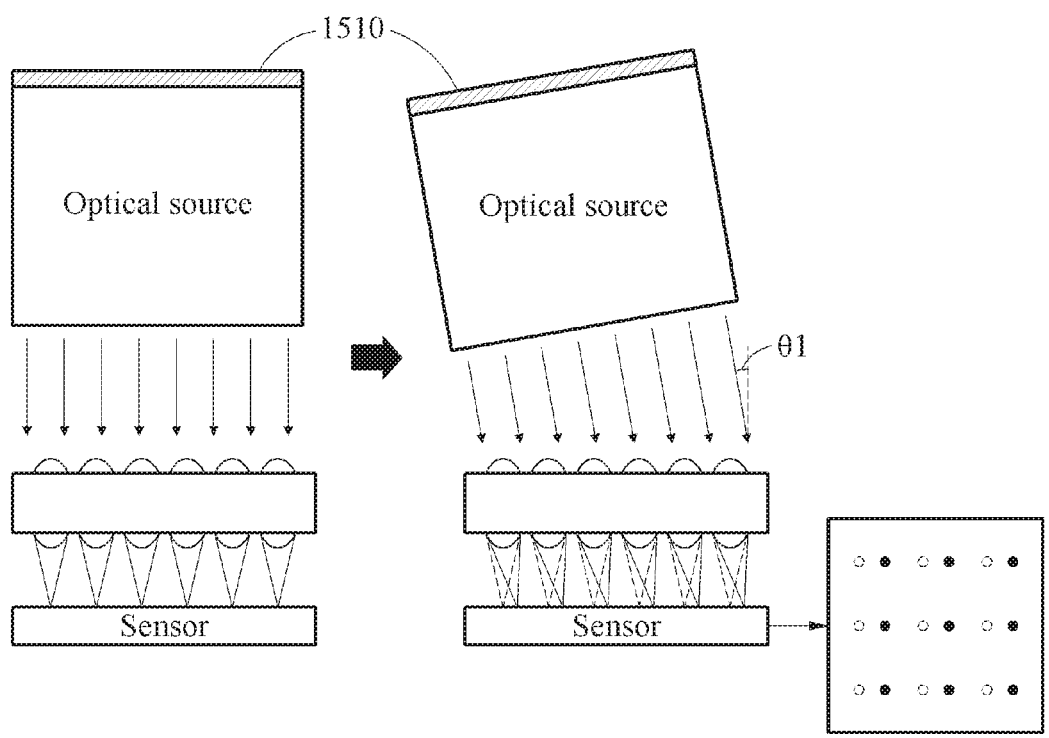
FIGS. 15 and 16 are diagrams illustrating an example of controlling an angle according to an exemplary embodiment.
Figure 16:
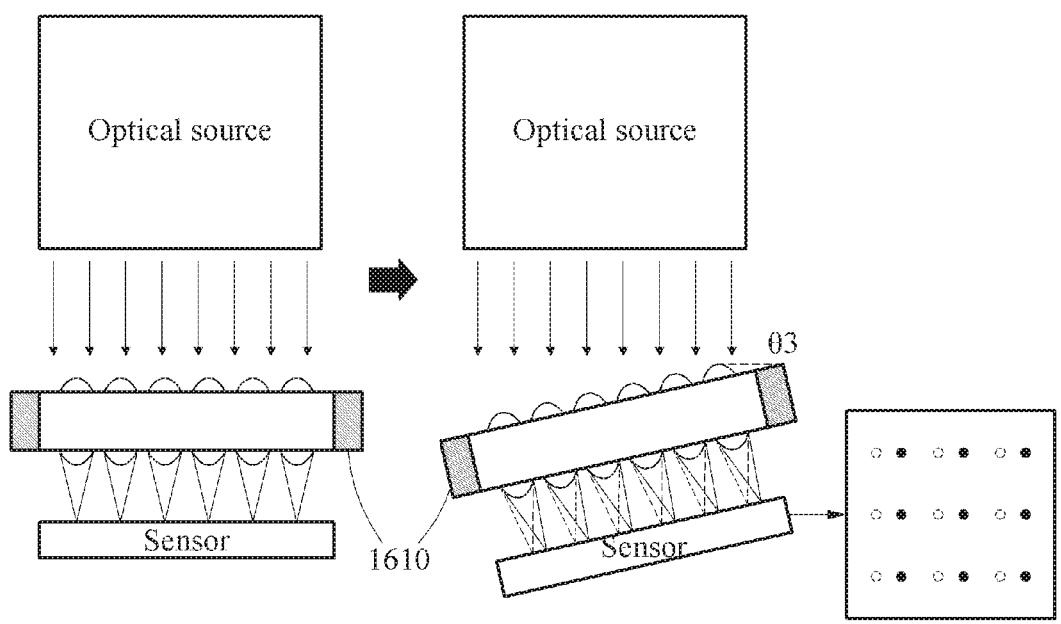

FIGS. 15 and 16 are diagrams illustrating an example of controlling an angle according to an exemplary embodiment.

FIG. 15 illustrates an example of position changes of spots imaged on a sensor when a control device 1510 controls a position and/or an angle of an optical source. To sense collimated light incident at various angles, the control device 1510 may be attached to the optical source and control a position and/or an angle of the optical source. Spots obtained before and after the control device 1510 changes an incident angle of the collimated light by $\theta_1$ are shown in a right portion of FIG. 15. Spots indicated by empty dots may be obtained before the control of the optical source and spots indicated by filled dots may be obtained after the control of the optical source.

FIG. 16 illustrates an example of position changes of spots imaged on a sensor when a control device 1610 controls positions and/or angles of multiple lenses. In this example, a sensor may be controlled together with the multiple lenses. To sense collimated light incident at various angles, the control device 1610 may be attached to the multiple lenses and control position and/or angles of the multiple lenses. Spots obtained before and after the control device 1610 changes an incident angle of the collimated light by $\theta_3$ are shown in a right portion of FIG. 16. Spots indicated by empty dots may be obtained before the control of the multiple lenses and sensor and spots indicated by filled dots may be obtained after the control of the multiple lenses and sensor.

As such, collimated light incident at various incident angles may be implemented by a control device controlling at least one of the optical source, the multiple lenses, and the sensor. Also, Spots at which the collimated light incident at various incident angles is incident may be sensed, so that a transformation matrix is determined. Although FIGS. 15 and 16 illustrate one angle at which the control is performed for ease of description, a range of a position and/or an angle to be controlled by a control device may correspond to an FOV range of multiple lenses.

Figure 17:
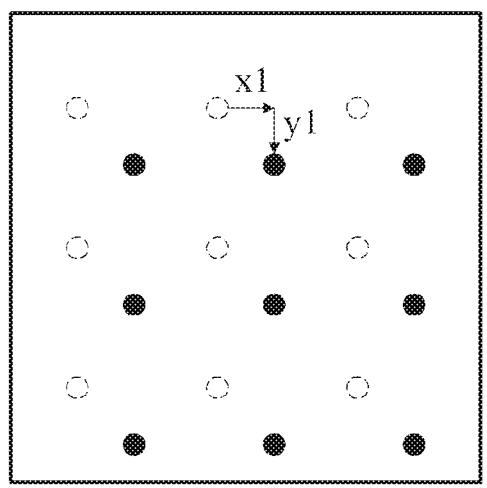
FIG. 17 is a diagram illustrating a process of calculating a displacement amount of a spot under a control according to an exemplary embodiment.

FIG. 17 is a diagram illustrating a process of calculating a displacement amount of a spot under a control according to an exemplary embodiment.

FIG. 17 illustrates an example in which an imaged spot on a sensor is moved by a control device performing a control on at least two axes. For example, a spot may be moved by x1 along an x axis and moved by y1 along a y axis. In FIG. 7, a spot obtained before the control is indicated by an empty dot and a spot obtained after the control is indicated by a filled dot. As such, by calculating a displacement amount of the spot, a pixel of a sensor to which a spot reaches in response to an incident angle of the collimated light being changed may be determined.

As described above, a transformation matrix for image restoration may be derived by sensing a spot while controlling an angle at which collimated light is incident on multiple lenses or an angle at which collimated light passing through the multiple lenses is incident on a sensor within an FOV range of the multiple lenses.

Figure 18:
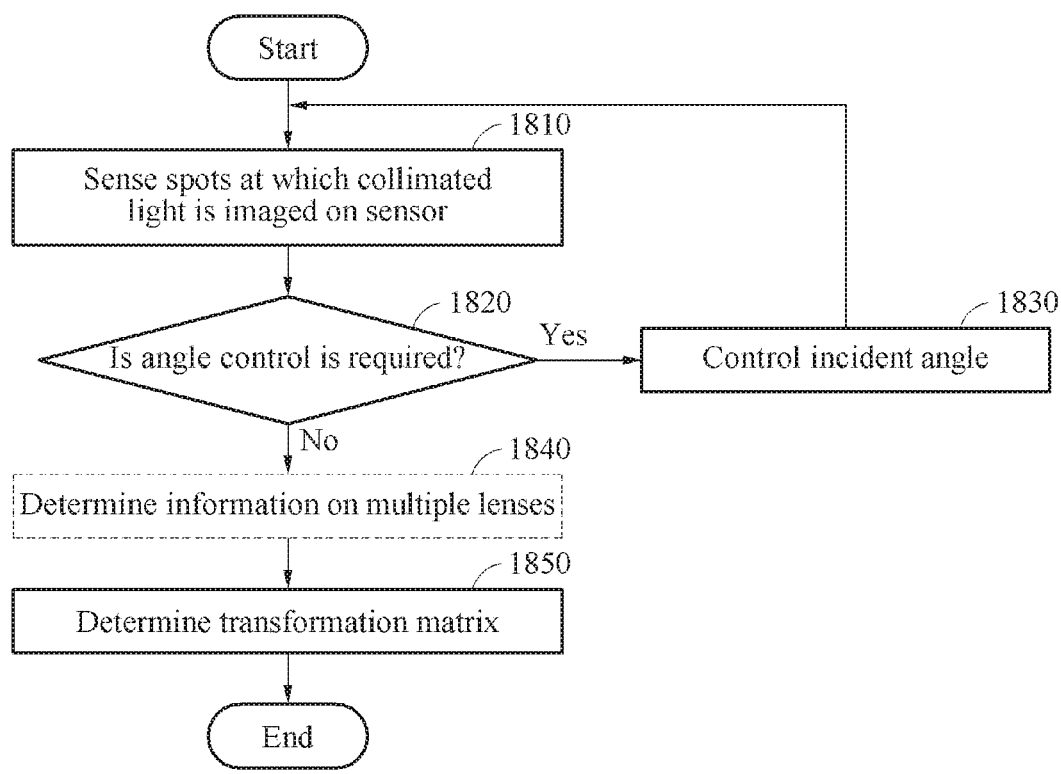
FIG. 18 is a diagram illustrating a calibration method according to an exemplary embodiment.

FIG. 18 is a diagram illustrating a calibration method according to an exemplary embodiment.

Referring to FIG. 18, a calibration method may be performed by a processor included in a calibration apparatus. An example of the calibration apparatus determining a transformation matrix by sensing spots at which collimated light incident at an angle changed by a minimum angle variation in an FOV range of the multiple lenses is imaged on the sensor will be described.

In operation 1810, the calibration apparatus senses spots at which collimated light passing through multiple lenses is imaged on a sensor. The calibration apparatus may store a result of the sensing in a memory.

In operation 1820, the calibration apparatus determines whether an angle control is required. For example, the calibration apparatus may determine whether a control is to be performed on an angle at which the collimated light is incident on the multiple lenses or an angle at which the collimated light passing through the multiple lenses is incident on the sensor. When an angle at which spot sensing is not performed is present within an FOV range of the multiple lenses, the calibration apparatus may determine that the angle control is required and thus, may perform operation 1830. When an angle at which spot sensing is not performed is absent within the FOV range of the multiple lenses, the calibration apparatus may determine that the angle control is not required and thus, may perform operation 1850.

In operation 1830, the calibration apparatus controls the angle at which the collimated light is incident on the multiple lenses or the angle at which the collimated light passing through the multiple lenses is incident on the sensor using a control device. After the angle control, operation 1810 may be performed again such that the spots are sensed at a corresponding angle.

In operation 1850, the calibration apparatus determines a transformation matrix for restoring an image acquired using the multiple lenses based on the sensed spots. For example, the calibration apparatus may determine the transformation matrix using results obtained by sensing the spots at angles, each changed by a minimum angle variation within the FOV range of the multiple lenses.

Hereinafter, an example in which the calibration apparatus determines a transformation matrix by sensing spots corresponding to some incident angles of collimated light within an FOV range of multiple lenses will be described.

In operation 1810, a calibration apparatus senses spots at which collimated light passing through multiple lenses is imaged on a sensor. The calibration apparatus stores a result of the sensing in a memory.

In operation 1820, the calibration apparatus determines whether an angle control is required. Some incident angles selected within an FOV range of the multiple lenses may be selected as a target for sensing. In this example, when the selected incident angles include an angle at which spot sensing has not performed, the calibration apparatus may determine that the angle control is required and thus, operation 1830 may be performed. When the selected incident angles does not include an angle at which spot sensing has not performed, the calibration apparatus may determine that the angle control is not required and thus, operation 1840 may be performed.

In operation 1830, the calibration apparatus may perform the angle control such that the collimate light is incident on incident angles at which spot sensing has not performed. Also, operation 1810 may be performed again, so that spot corresponding to the incident angles are sensed.

In operation 1840, the calibration apparatus may determine information on the multiple lenses based on a result of the sensing. Here, the information on the multiple lenses may include at least one of rotation information, pitch information, and aberration information of the multiple lenses, gap information of the sensor and the multiple lenses, and blur information of an image acquired using the multiple lenses.

In operation 1850, the calibration apparatus may determine a transformation matrix for restoring an image acquired using the multiple lenses based on the information on the multiple lenses.

Since the description made with reference to FIGS. 1 through 17 is also applicable to the operations of FIG. 18, repeated description will be omitted.

Figure 19:
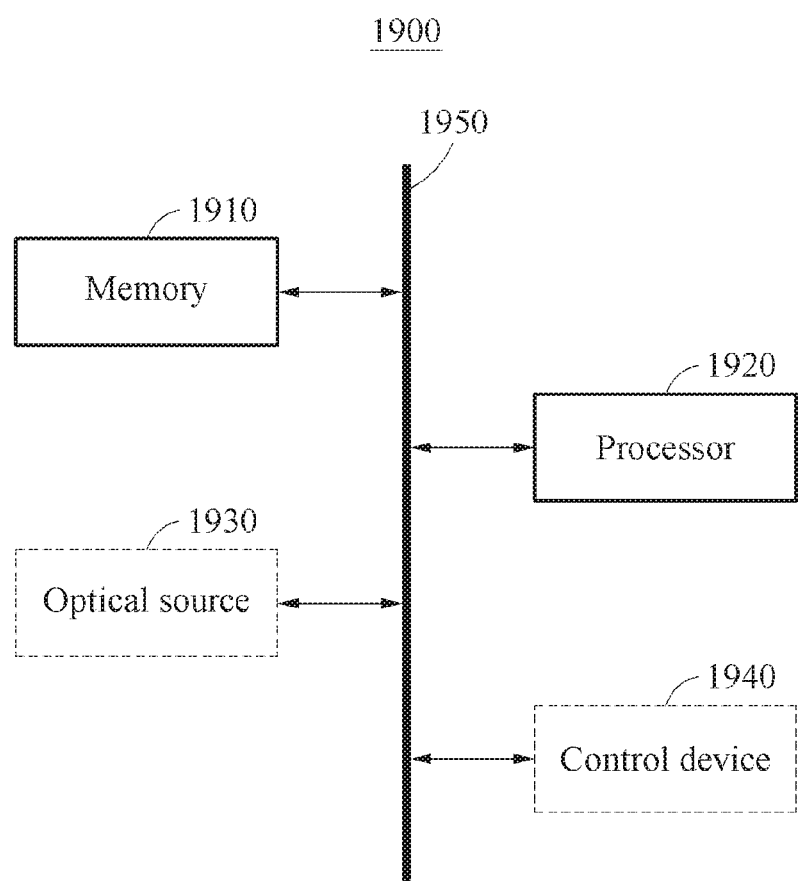
FIG. 19 is a diagram illustrating a calibration apparatus according to an exemplary embodiment.

FIG. 19 is a diagram illustrating a calibration apparatus according to an exemplary embodiment.

Referring to FIG. 19, a calibration apparatus 1900 includes a memory 1910 and a processor 1920. The calibration apparatus 1900 may further include an optical source 1930 and a control device 1940 for a location and/or an angle. The memory 1910, the processor 1920, the optical source 1930, and the control device 1940 may communicate with one another through a bus 1950.

The memory 1910 may include instructions to be read by a computer. The processor 1920 may perform the aforementioned operations in response to the instructions included in the memory 1910 being executed by the processor 1920. The memory 1910 may be a volatile memory or a non-volatile memory.

The processor 1920 may sense spots at which collimated light passing through multiple lenses is imaged on a sensor and determine a transformation matrix for restoring an image acquired using the multiple lenses based on the spots.

The optical source 1930 may generate the collimated light and provide the collimated light to a multi-lens camera.

The control device 1940 may control a location and/or an angle of at least one of the optical source 1930, the multiple lenses, and the sensor.

The calibration apparatus 1900 may perform calibration based on a relationship between the sensor and the multiple lenses. The calibration apparatus 1900 may determine the transformation matrix required for image restoration by sensing spots at which the collimated light passing through the multiple lenses at various angles is imaged on the sensor. In addition, the calibration apparatus 1900 may process the operations described above.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

While this disclosure includes exemplary examples, it will be apparent to one of ordinary skill in the art that various changes in form and details may be made in these examples without departing from the spirit and scope of the claims and their equivalents.

What is claimed is:

1. A calibration method comprising:
    sensing spots at which collimated light passing through multiple lenses is imaged on a sensor;
    determining whether a control is to be performed to change an angle at which the collimated light is incident on the multiple lenses or an angle at which the collimated light passing through the multiple lenses is incident on the sensor;
    controlling, in response to a determination that the control is to be performed, the angle at which the collimated light is incident on the multiple lenses or the angle at which the collimated light passing through the multiple lenses is incident on the sensor; and
    determining a transformation matrix configured to restore an image acquired by the multiple lenses based on the spots;
    wherein the sensing of the spots comprises sensing spots corresponding to the collimated light incident on the multiple lenses or corresponding to the sensor at the controlled angle, and
    wherein sizes of the spots are smaller than a pixel included in the sensor.

2. The calibration method of claim 1, wherein the sensing of the spots comprises:
    sensing spots at which the collimated light incident at an angle changed by a minimum angle variation within a field of view (FOV) range of the multiple lenses is imaged on the sensor.

3. The calibration method of claim 1, wherein the determining of the transformation matrix comprises:
    determining the transformation matrix based on pixel information of the sensor sensing the spots.

4. The calibration method of claim 1, wherein the sensing of the spots comprises sensing spots at which the collimated light incident at angles selected within an FOV range of the multiple lenses is imaged on the sensor, and
    the determining of the transformation matrix comprises determining the transformation matrix by applying linear fitting to a result of the sensing.

5. The calibration method of claim 1, further comprising:
    determining information on the multiple lenses based on the spots,
    wherein the determining of the transformation matrix comprises determining the transformation matrix based on the information on the multiple lenses.

6. The calibration method of claim 5, wherein the information on the multiple lenses comprises at least one of rotation information, pitch information, and aberration information of the multiple lenses, gap information of the sensor and the multiple lenses, and blur information of an image acquired using the multiple lenses.

7. The calibration method of claim 6, wherein the determining of the information on the multiple lenses comprises:
    determining the rotation information of the multiple lenses based on a gradient of a connection line connecting the spots.

8. The calibration method of claim 6, wherein the determining of the information on the multiple lenses comprises:
    determining the pitch information of the multiple lenses based on a distance between the spots.

9. The calibration method of claim 6, wherein the determining of the information on the multiple lenses comprises:
    determining the gap information of the sensor and the multiple lenses based on a change in size of the spots.

10. The calibration method of claim 6, wherein the determining of the information on the multiple lenses comprises:
    determining the aberration information of the multiple lenses based on the sizes of the spots.

11. The calibration method of claim 6, wherein the determining of the information on the multiple lenses comprises:
    determining the blur information of the image acquired using the multiple lenses through a sensor pixel analysis on the spots.

12. The calibration method of claim 1, wherein the transformation matrix is configured to restore an image by modeling a light particle recorded in the sensor.

13. The calibration method of claim 1, wherein the multiple lenses comprises a micro-lens array comprising a plurality of lenses.

14. A non-transitory computer-readable storage medium storing instructions that, when executed by a processor, cause the processor to perform the calibration method of claim 1.

15. A calibration apparatus comprising:
    a processor; and a memory comprising at least one instruction to be executed by the processor, wherein when the at least one instruction is executed in the processor, the processor is configured to:
  sense spots at which collimated light passing through multiple lenses is imaged on a sensor,
  determine whether a control is to be performed to change an angle at which the collimated light is incident on the multiple lenses or an angle at which the collimated light passing through the multiple lenses is incident on the sensor,
  control, in response to a determination that the control is to be performed, the angle at which the collimated light is incident on the multiple lenses or the angle at which the collimated light passing through the multiple lenses is incident on the sensor, and
  determine a transformation matrix configured to restore an image acquired using the multiple lenses based on the spots, wherein the processor is further configured to sense spots corresponding to the collimated light incident on the multiple lenses or corresponding to the sensor at the controlled angle, and wherein sizes of the spots are smaller than a pixel included in the sensor.

* * * * *